US006559619B1

(12) United States Patent
Bach

(10) Patent No.: US 6,559,619 B1
(45) Date of Patent: May 6, 2003

(54) ENERGY MANAGEMENT CONTROLLER

(76) Inventor: Daniel G. Bach, 470 N. 56th St., Chandler, AZ (US) 85226

( * ) Notice: Subject to any disclaimer, the term of this patent is extended or adjusted under 35 U.S.C. 154(b) by 0 days.

(21) Appl. No.: 09/625,341

(22) Filed: Jul. 25, 2000

(51) Int. Cl.[7] .............................................. H02P 5/28
(52) U.S. Cl. ...................... 318/729; 318/438; 318/727; 323/205
(58) Field of Search ................................ 318/438, 729, 318/727; 323/205, 217

(56) References Cited

U.S. PATENT DOCUMENTS

| | | | |
|---|---|---|---|
| 4,404,511 A | | 9/1983 | Nola ........................... 318/729 |
| 5,159,255 A | * | 10/1992 | Weber ......................... 318/775 |
| 5,428,283 A | * | 6/1995 | Kalman et al. ............. 318/438 |
| 5,592,062 A | | 1/1997 | Bach ........................... 318/805 |
| 5,760,556 A | * | 6/1998 | Hamilton et al. ........... 318/438 |
| 5,932,934 A | * | 8/1999 | Hofstetter et al. ............ 307/26 |
| 6,091,218 A | * | 7/2000 | Ritch .......................... 165/246 |
| 6,225,760 B1 | * | 5/2001 | Moan ...................... 315/209 R |
| 6,229,288 B1 | * | 5/2001 | Baretich et al. ............ 323/223 |

* cited by examiner

Primary Examiner—Rita Leykin
(74) Attorney, Agent, or Firm—Ellis & Venable, PC

(57) ABSTRACT

An improved energy controller that increases the electrical efficiency of AC induction motors and electrical lights that is comprised of a microcontroller integrated with a signal control circuit to regulate the amount of the input line A/C signal that passes from the input the to electrical device. The microcontroller includes circuitry to measure the phase of the voltage and current of the input A/C signal and the shift of the phase across the motor or electric light. Using this phase difference, the microcontroller can determine the power factor and regulate the amount of power provided to the electric motor or light in response to changes in loading on the motor or light. The energy controller includes software that enables the microcontroller to provide a soft-start for induction motors.

9 Claims, 4 Drawing Sheets

ENERGY MANAGEMENT CONTROLLER

FIELD OF THE INVENTION

This invention generally relates to the field of electrical systems that are employed to reduce the energy consumption of electrically-powered devices. More specifically, the present invention relates to an energy management device that employs a micro-controller and software system to regulate an A/C signal to reduce the energy consumption of an induction motor.

BACKGROUND

Reducing energy consumption is a prime goal in the world today. For consumers, reducing the amount of energy they consume individually lowers their personal energy costs. In addition, reduced energy consumption helps to conserve our natural resources and protect the environment.

At present, there are many energy saving systems in existence that reduce the energy consumption of electrical devices. One electrical device that can have its power consumption reduced by an energy saving device is an induction motor. Induction motors are commonly used for a wide variety of residential, commercial, and industrial purposes. The power requirements of an induction motor typically vary during operation. The inherent design of an induction motor causes it to use excessive current and voltage even under light or no load conditions. One measure of induction motor efficiency is to value the voltage applied as a function of motor load. Induction motors draw the same current whether loaded or unloaded. As a result, the motor efficiency decreases as the load decreases. In other words, an AC induction motor will consume much more energy than it requires under light load conditions.

AC induction motors are rather inefficient when they are not matched properly to their load. A motor is most efficient when it is heavily loaded and the rotor slips from its unloaded synchronous speed. As a bi-product of rotor slip, power factor is effected making the current closer in phase of the voltage.

Rotor slip can be induced not only by loading a motor, but also by reducing its average power supplied in such a manner as to remove sections of, the sinusoidal excitation waveform. Such a technique can greatly enhance the efficiency of the motor under light load conditions. The ultimate result is realized in power savings and lower operating costs.

Currently, many devices exist that vary the power supplied to the induction motor to enhance motor efficiency. U.S. Pat. No. 4,404,511 issued to Nola teaches a motor controller that is designed to enhance induction motor efficiency. A resistor is used to sense the input current to the motor. A circuit is used to generate a control signal that represents the phase shift difference between the motor current and motor voltage, which is the power factor. As the loading on the motor changes, the power factor changes. When the power factor is changed due to a decrease in the load on the motor, the device increases the off time of the duty cycle of the AC line power applied to the induction motor thereby reducing the current used by the motor. In this arrangement, the amount of power savings is scaled according to the power used by the device.

The key aspect of the device disclosed in Nola is that it senses the current using a resistive element. The Patent issued to Nola represents a class of energy management devices for induction motors that use resistive elements to measure current. The use of resistors to measure current has many disadvantages. First, the resistors required for measuring current are typically very large physically. This large physical size prevents the ability to fully miniaturize these devices. In addition, the cost of reliable resistive devices is typically very high. Further, resistors produce a great deal of heat while measuring the current. This heat reduces the efficiency of the device. Also, this heat can pose a design problem for the device since it also uses a microcontroller that must operate within a certain temperature range. It is therefore highly desirable to develop a system that can determine the phase shift without using a resistive element to measure current.

It is possible to determine a phase shift between the current and voltage without using a resistive element to measure the current. It is possible to determine the power factor by measuring the point where the current and voltage of and AC signal crosses zero. A voltage sampler circuit provides signals that indicate when the voltage applied to the motor crosses zero. An additional circuit is used to provide a signal that indicates when the current flow through the motor crosses zero. This system of measuring the power factor does not use any resistive elements. This method of sampling the zero point of the current and the voltage, referred to as the zero point system, has many advantages over the method that uses resistive elements. First, due to the fact that it uses no resistive elements, the zero point system is less expensive to manufacture. In addition, the zero point system uses less energy due to the lack of any resistors. Also, not using any resistors lowers the heat produced by the device. Finally, it is possible to miniaturize the circuitry of the zero point system to a greater extent since it does not include resistors.

U.S. Pat. No. 5,592,062 issued to Bach, the inventor of the technology disclosed in this application, teaches an energy controlling circuit for use with AC induction motors. The patent issued to Bach teaches the use of circuitry that determines when the current and voltage cross zero to find the power factor. This device utilizes a microcontroller in conjunction with a triac to control the duty cycle of the AC power applied to the motor. A voltage sensing circuit provides signals to the microcontroller. The micro controller is also coupled to the gate of the triac. The microcontroller automatically selects the appropriate parameters for most efficient motor operation based upon the motor power factor by the time at which the voltage across the motor crosses zero and the voltage at the triac gate crosses zero.

In addition to induction motors, various other electrical devices such as electric light bulbs do not operate at peak efficiency. It is also possible to enhance the electrical efficiency of these electrical devices by measuring the load across the light bulb and altering the input signal accordingly.

SUMMARY OF THE INVENTION

The present invention is an improved energy controller that increases the electrical efficiency of AC induction motors, electric lights, and other electrical devices. The invention is an integration of electrical circuitry and computer software to regulate the power supplied to the induction motor or electric light thereby enhancing the efficiency of the motor or light. As stated earlier, the inherent design of the induction motor causes it to use excessive current and voltage even under light or no-load conditions. The present invention takes advantage of this design by reducing the current and voltage consumed by the motor when not fully loaded. The frequency and peak voltage are not changed so the motor speed is not affected. The invention monitors the AC signal and senses when the motor is consuming more power than required. When the motor consumes more power than required, the invention removes a portion of the AC signal thereby allowing the motor to continue its rotational motion while consuming less energy. The amount of the signal that is removed, or "clipped," is determined by the actual load on the motor. The actual load on the motor is calculated by the invention by comparing current and voltage phase angles. Under light loads, the amount of voltage removed from the AC signal is large. As the load demanded by the motor increases, the width of the slice removed from the signal will decrease, to the point where under fully loaded conditions the slice removed is negligible and full power is allowed to flow to the motor.

For electric lights, the microcontroller measures the loading across the light bulb and accordingly reduces the input A/C signal to the minimum level power level where the quality of light emitted from the light bulb is not reduced.

The present invention is comprised of a software-controlled microcontroller. The microcontroller is connected to circuitry that measures when the voltage and current cross the zero reference point along the current or voltage axis. In addition, the invention includes a bypass or relay circuit that can bypass the microcontroller and signal clipping circuitry and supply the input AC signal directly to the induction motor or electric light.

In addition, the present invention includes software that determines whether the device is functioning correctly. In the event the invention is not properly measuring the phase shift, or correctly clipping the AC signal; the software activates a bypass circuit and turns the remainder of the device off. The bypass circuit allows the AC input signal to flow unaffected to the induction motor or electric light. The use of this bypass circuit is also an improvement over patent, U.S. Pat. No. 5,592,062.

A further improvement over U.S. Pat. No. 5,592,062, is the use of a silicon control rectifier in place of the triac disclosed in the previous patent. The triac in the previous patent is used to control the amount of voltage supplied to the motor. The silicon control rectifier performs the same function. However, the silicon control rectifier has many advantages over the triac making the present invention superior to the invention disclosed in U.S. Pat. No. 5,592,062. The silicon control rectifier is cheaper to manufacture and is physically smaller in size.

In addition, the present invention is designed to provide a "soft start" for induction motors. Induction motors draw a large amount of power when they are turned on thereby placing a lot of strain on the power system supporting the motor. One way to eliminate the strain on the power system caused by turning on the induction motor is to soft start the motor. A soft start occurs when the voltage applied to the motor is gradually raised.

The primary object of the invention is to provide a new and improved energy control device for induction motors and electric lights.

It is another object of the invention is to provide circuitry and software that will shut the device down if it is not functioning correctly.

Another object of the invention is to use software to measure the power factor thereby eliminating the need for a resistive element to measure the current going through the motor or electric light.

A still further object of the invention is to pass the input AC signal directly to the induction motor or electric light in the event that the device is shut down.

Another object of the invention is to reduce the cost and size of energy control devices by replacing the triac circuit with a silicon control rectifier.

A further object of the invention is to provide an option to have a soft start for induction motors.

Further objects and advantages of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings wherein:

DESCRIPTION OF THE PREFERRED EMBODIMENTS

Figure 1:
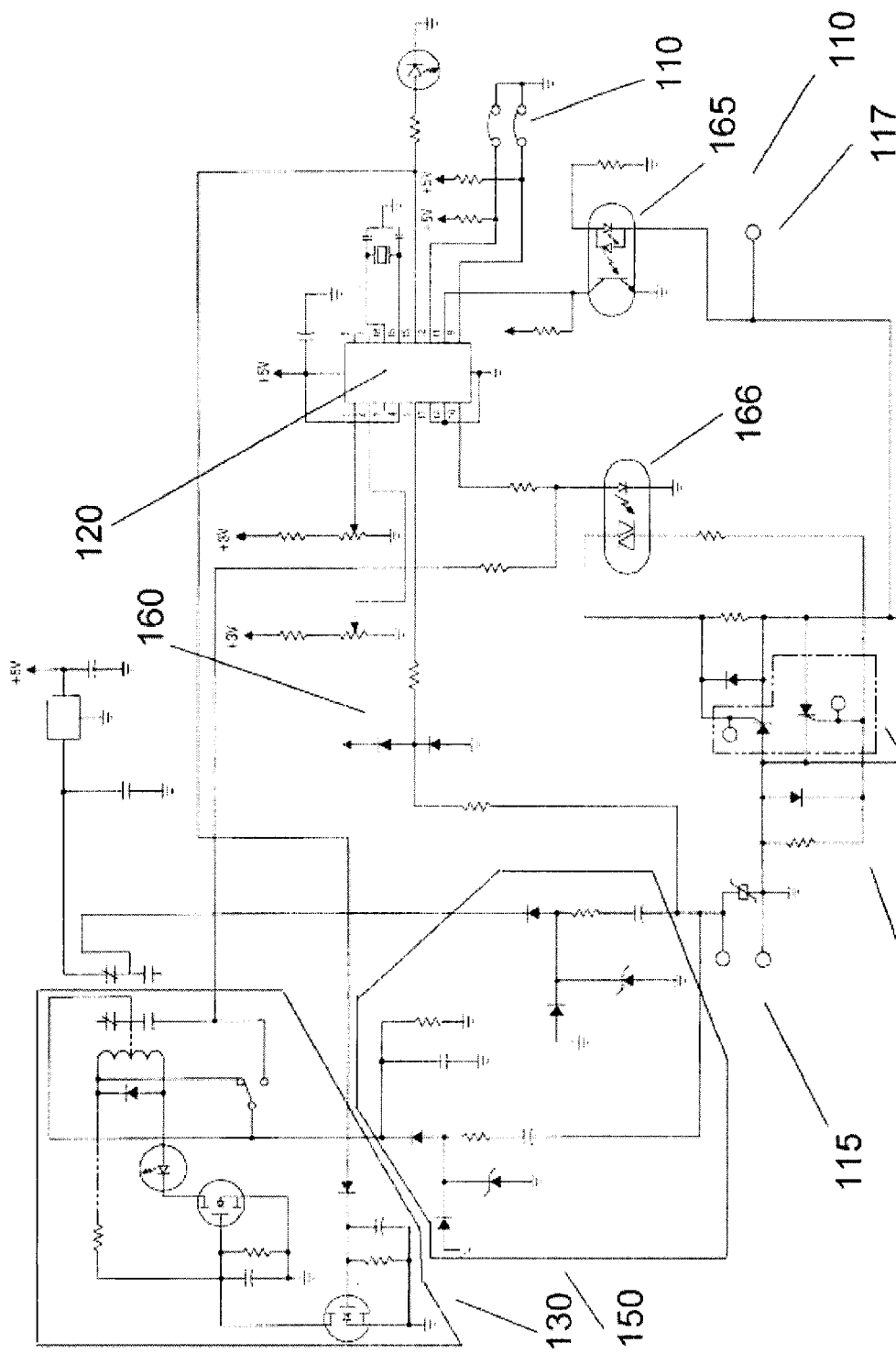
FIG. 1 shows a circuit diagram of the device.
Figure 3:
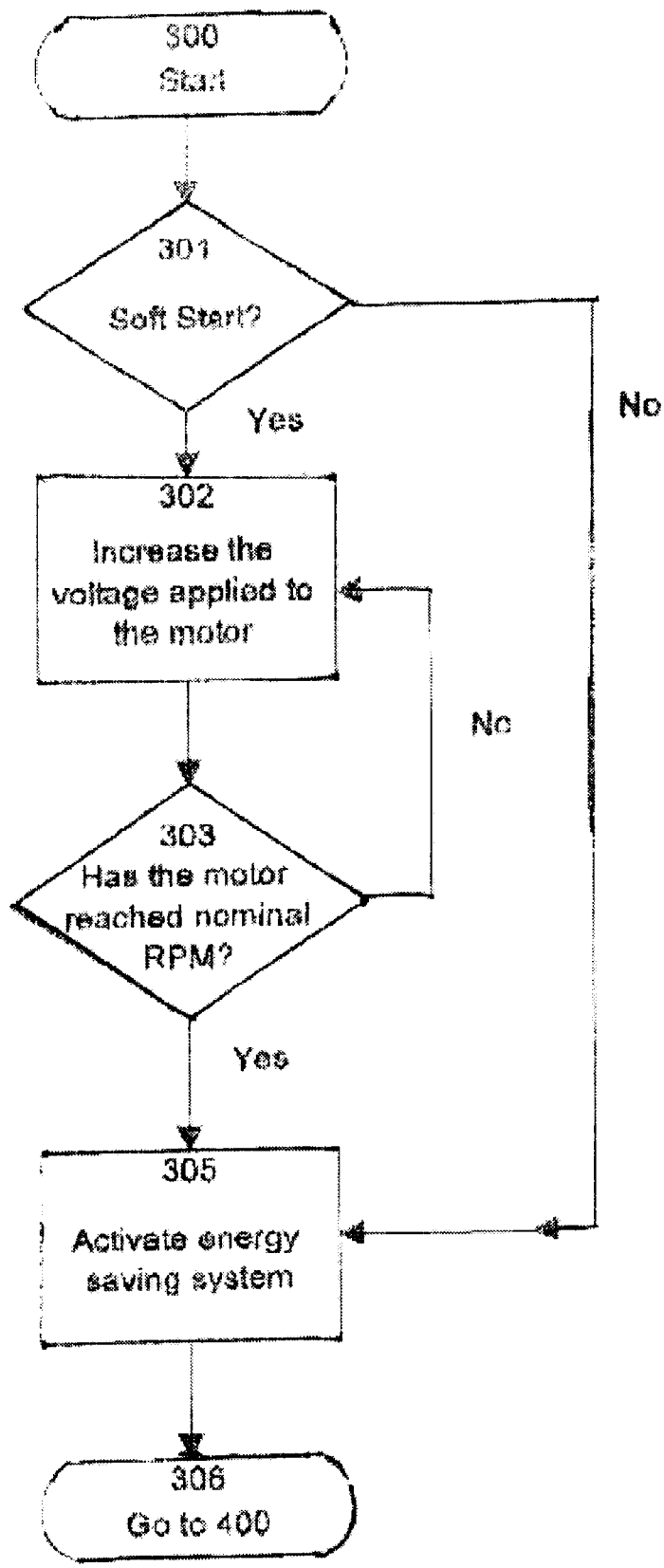
FIG. 3 shows the process of how the device provides a soft start.
Figure 4:
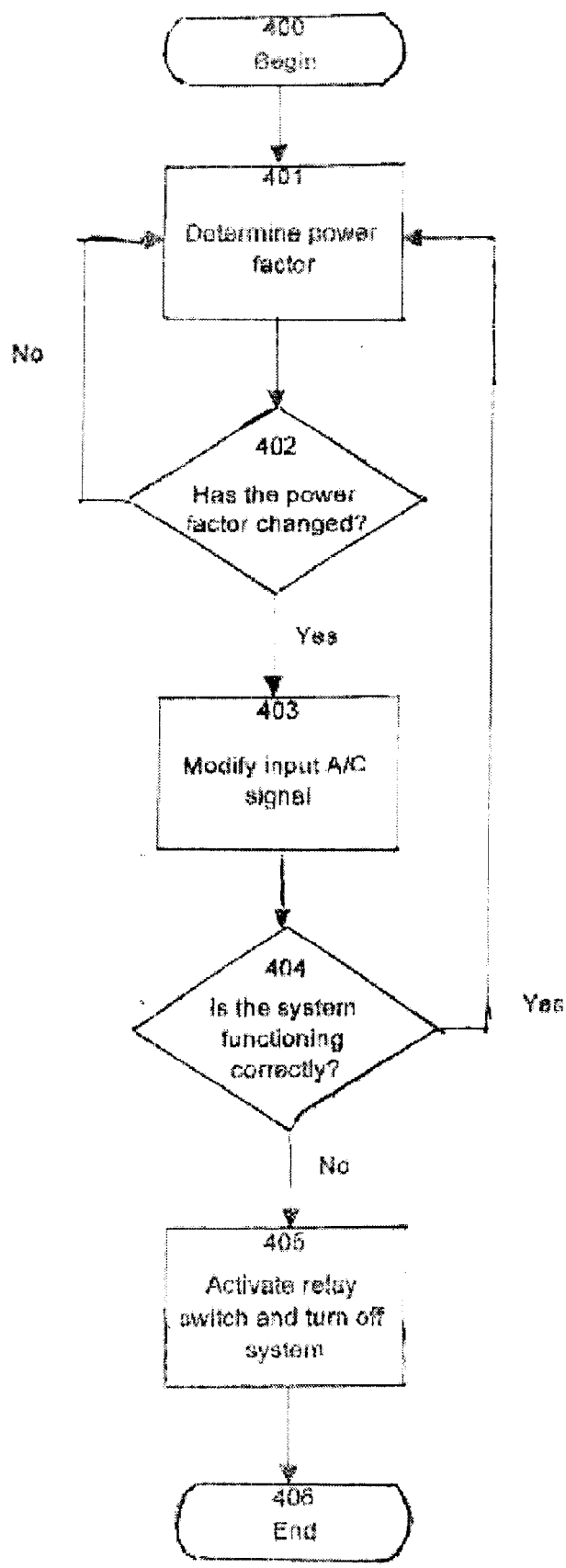
FIG. 4 shows the energy saving process.

A circuit diagram showing the power savings device 100 is shown in FIG. 1. The power savings device 100 is used to regulate the power supplied to a motor 110 or electric light 110. The remainder of this application will describe the use of the power savings device 100 with the induction motor 110 as an example. However, the structure and function of the device 100 is the same if another electrical device such as an electric light were attached to the device 100 instead of the induction motor 110. The power savings device 100 is controlled by an 8-bit RISC microcontroller 120 that is operated by a software program contained in a Read Only Memory (ROM). The microcontroller 120 includes a microprocessor, memory, and an analog/digital converter. The microcontroller 120 is a commercially available product. The processes executed by the software program are shown in FIGS. 3 and 4. The power savings device 100 includes a rectifier 150. The rectifier circuit 150 measures the phase of the voltage of the line A/C signal when the line A/C signal is at zero volts. The line A/C signal that powers motor 110 is placed across the inputs 115. The portion of the line A/C signal that passes through to the controller is modified by the pair of diodes 160. The pair of diodes 160 modifies the A/C signal into a square wave, which is the input signal for the microcontroller 120. An opticoupler 165 connected to the microcontroller 120 is used to sense the point where the voltage applied across the motor crosses the zero mark. The microcontroller 120 uses the phase of the input A/C signal determined by the rectifier 130 and the zero crossing point of the A/C signal across the motor 110 found by the opticoupler 165 to calculate the power factor of the motor 110.

The microcontroller 120 uses another opticoupler 166 to regulate a signal control circuit 200. The signal control circuit 200 is used to control the amount of the line A/C signal that is passed through to the motor 110 is regulated by the signal control circuit 200. The microcontroller 120 uses the signal control circuit 200 to clip the input A/C line signal to reduce the power supplied to the motor 110. The signal control circuit 200 is constructed using a pair of silicon control rectifiers 210.

The power savings device 100 includes a relay circuit 130. The relay circuit 130 is a failsafe feature. In the event that the power savings device 100 is not functioning properly, the relay circuit 130 is activated by the microcontroller 120. The relay circuit 130 bypasses the signal control circuitry 200 and passes the input A/C signal directly to the motor 110.

The mircocontroller 120, relay circuit 130, rectifier 150, and signal control circuit 200 are coupled to form a signal circuit having an input 115 and an output 117. An input voltage signal appears at the input 115. An electrical device 110 such as an electric light or induction motor 110 is connected to the output 117. An output signal is measured across the output 117.

The microcontroller 120 is programmed to turn on the motor 110 in two ways. One method of turning on the motor 110 is through a soft-start. Under a soft-start, the voltage applied to motor 110 is gradually raised from a zero level. This gradual rise in the voltage increases the motor 110 rpm from zero to a nominal value. Alternatively, the motor can be turned on in a cold-start. In a cold start, the full A/C input line voltage is applied to the motor 110. A jumper 116 is used to program the microcontroller to operate in the soft-start mode or the cold-start mode.

Figure 2:
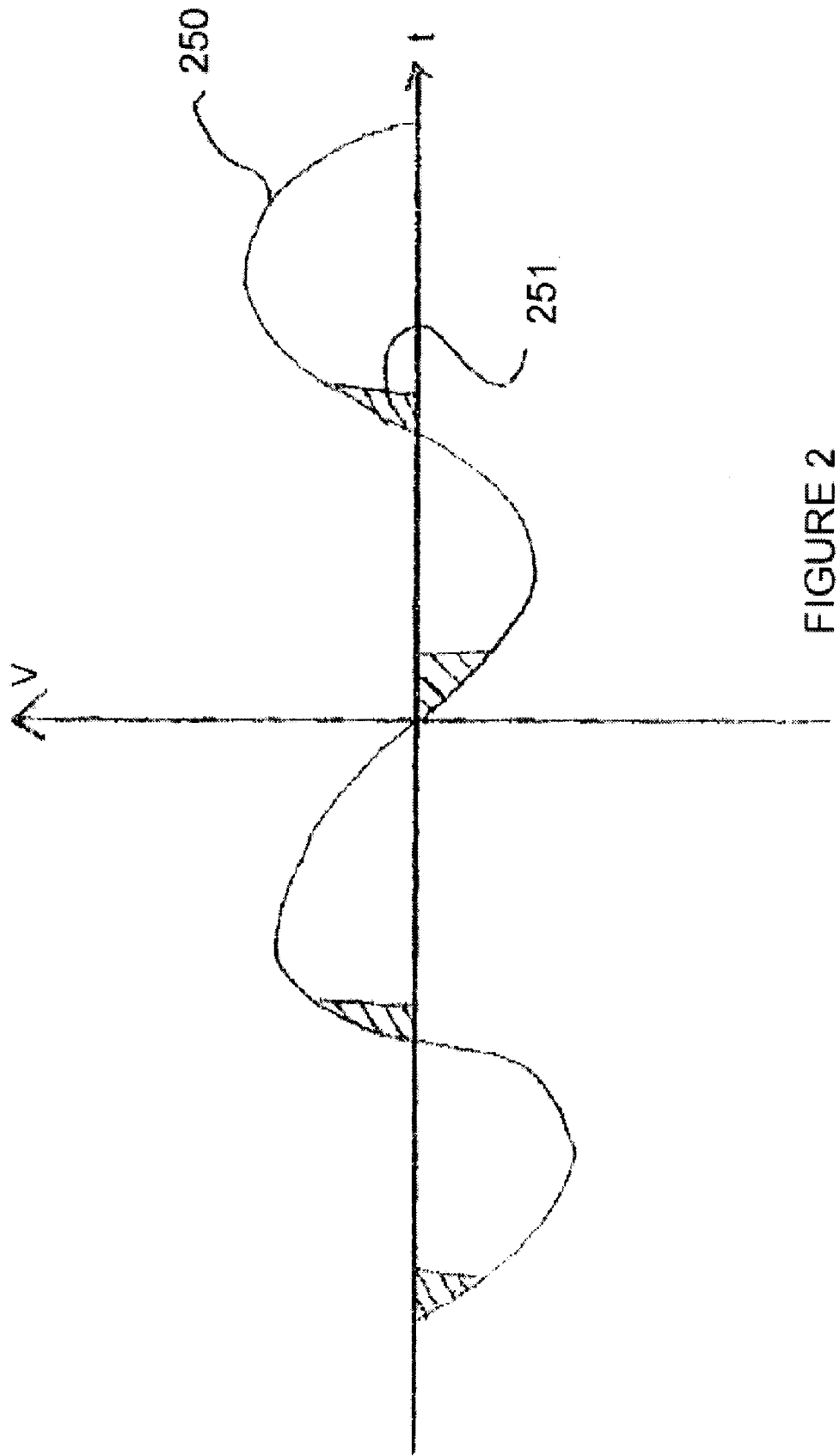
FIG. 2 shows a modified A/C signal.

FIG. 2 shows an input A/C signal and how the power saving device 100 alters the signal under normal operation. The pure sinusoidal signal 250 is the line input A/C signal that appears at the inputs 115. The darkened portion 251 of the signal 250 is that portion of the sinusoid that is clipped by the signal control circuit 200. Through clipping the signal 250 at the point after the signal crosses the zero mark, the peak voltage and frequency of the signal is not changed.

The process of activating the energy power saving device 100 is shown in FIG. 3. The user of the device 100 can select whether to turn on the motor with a soft-start in step 301 through the placement of jumper 116. Under a soft-start, the voltage applied to motor 110 is gradually raised from a zero level. This gradual rise in the voltage increases the motor 110-rpm from zero to a nominal value. Opticoupler 165 is used to sense the A/C voltage across the motor 110 and note when that A/C signal voltage crosses the zero level. The silicon control rectifiers 210 control the amount of voltage that is passed through to the motor 110. Under soft-start, the silicon control rectifiers 210 are fired in calculated periods of time to allow portions of the input A/C signal to pass through to the motor 110. A soft-start is selected by the positioning of a jumper cable 116 provided on the device. If a soft-start has been selected, the system 100 proceeds to steps 302 and 303. The microcontroller 120 fires the silicon control rectifiers 210 in step 302 in time periods to slowly increase the voltage level from a zero level to a higher level. In step 303, the microcontroller 120 determines if the voltage has been raised to a level where the motor 110 is operating at a nominal rpm. If the motor 110 is not operating at a nominal rpm, the microcontroller 120 continues to increase the amount of the input A/C signal that is passed through to the motor 110 through controlling the silicon control rectifiers 210 under step 302. When the motor 110 is operating at a nominal rpm, the microcontroller 120 activates the energy saving system 400 in step 305.

In the event that a soft-start is not selected in step 301, the motor 110 is activated under a cold-start. Under a cold-start, the full A/C signal is passed through to the motor 110 and the energy saving system 400 is activated in step 305.

The energy saving system 400 is shown in FIG. 4. The first step in the energy saving system is to determine the power factor in step 401. In order to determine the power factor, it is necessary to measure the zero voltage crossing of the line voltage A/C waveform and the zero voltage crossing of the voltage waveform across opticoupler 165. Since the opticoupler 165 is in phase with the motor 110, the zero voltage crossing of the opticoupler 165 has the same phase as the zero voltage crossing as the waveform across the motor 110. The microcontroller 120 senses the zero voltage crossing of the line voltage A/C wave form from the output of the signal generated by the rectifier 150 and diodes 160. The microcontroller 120 also senses the zero voltage crossing of the voltage at the opticoupler 165. Using this data, the microcontroller 120 determines the power factor.

Through determining the power factor, the microcontroller 120 is programmed to determine if there is a change in the power factor in step 402. A change in the power factor indicates that there is a change in the loading on the motor 110. If there is no change in the power factor, the microcontroller 120 provides a control signal at its output to regulate the firing of the silicon control rectifiers 210 to maintain the amount of the A/C input signal that is passed through to the motor 110. The microcontroller 120 then proceeds back to step 401 to determine the power factor and then recalculates if a change has occurred. Once a change in the power factor is detected, the microcontroller 120 proceeds to step 403. In step 403, the microcontroller 120 provides a control signal at its output to regulate the firing of the silicon control rectifiers 210 at a different time period to account for the change in loading. In the event that power factor changes due to a decrease in the loading, the microcontroller 120 will regulate the silicon control rectifiers 210 to reduce the amount of the A/C signal that is passed through to the motor 110. If instead, the power factor changes due to an increase in the loading on the motor 110, the microcontroller 120 will regulate the silicon control rectifiers 165 to increase the amount of the A/C signal that is passed through to the motor 110.

During the operation of the power savings system 400, the microcontroller 120 performs a check 404 to determine if the power savings system 400 is functioning within nominal operating parameters. If the power savings system 400 is functioning within nominal operating parameters, the microcontroller 120 continues to execute steps 401, 402, 403, and 404 as shown in FIG. 4. However, in the event that the microcontroller 120 detects that the power savings system 400 is not functioning correctly, the microcontroller 120 will activate the relay switch 130. The relay switch 130 is designed to bypass the signal altering circuitry including the microcontroller 120 and signal control circuit 200 and pass the input A/C signal unaffected to the motor 110. In addition, when a malfunction is detected in the power savings system 400, the microcontroller 120 turns the power savings system 400 off and the program ends until restarted.

While the invention has been shown and described with reference to a particular embodiment thereof, it will be understood to those skilled in the art, that various changes in form and details may be made therein without departing from the spirit and scope of the invention.

I claim:

1. An energy saving device comprised of:

a microcontroller;

said microcontroller further including a Read Only Memory wherein a software program resides;

a rectifier circuit;

an optocoupler;

an input;

an output; and a signal control circuit comprised of a pair of silicon control rectifiers, said rectifier circuit, said optocoupler, said input, said output, said signal control circuit, and said microcontroller are coupled to form a main circuit, said rectifier and said optocoupler measure a phase change of a voltage and current of a first signal appearing at said input and a second signal appearing at said output, said microcontroller responds to said phase change and alters said second signal.

2. The energy saving device recited in claim 1, further comprising a relay circuit, said relay circuit is coupled to said main circuit whereby said relay circuit directly connects said input to said output bypassing said signal control circuit.

3. The energy saving device recited in claim 2, wherein said microcontroller activates said relay switch when said microcontroller is not functioning properly.

4. The energy saving device, recited in claim 3, further comprising a pair of diodes, said pair of diodes are connected to said microcontroller to alter said first signal appearing at said input into a square wave.

5. A process for reducing the energy consumption of an electrical device comprising the determining the phase of an input voltage signal;

determining the phase of an output voltage signal;

determining the power factor;

modifying said input voltage signal thereby reducing the power of said output voltage signal; and bypassing a signal control circuit when a microcontroller fails to function properly.

6. The process as recited in claim 5, further comprising the step of:

determining whether a change in the power factor has occurred.

7. The process as recited in claim 6, wherein the step of determining whether the change in the power factor has occurred is made by said microcontroller.

8. The process as recited in claim 7, wherein said input voltage signal is modified by a silicon control rectifier.

9. The process as recited in claim 7, wherein said input signal is modified by a silicon control rectifier.

* * * * *